(12) United States Patent
Albert et al.

(10) Patent No.: US 7,016,647 B2
(45) Date of Patent: Mar. 21, 2006

(54) METHOD AND SYSTEM FOR DATA COMMUNICATION BETWEEN A READ/WRITE DEVICE AND A MOBILE MEMORY DEVICE BASED ON TRANSFER-TIME MEASUREMENT

(75) Inventors: Olaf Albert, Vienna (AT); Janos Gila, Moedling (AT); Wolfgang Konrad, Moedling (AT); Martin Schiefer, St. Poelten (AT); Peter-Ernst Veith, Vienna (AT)

(73) Assignee: Siemens Aktiengesellschaft, Munich (DE)

(*) Notice: Subject to any disclaimer, the term of this patent is extended or adjusted under 35 U.S.C. 154(b) by 459 days.

(21) Appl. No.: 10/164,405

(22) Filed: Jun. 10, 2002

(65) Prior Publication Data
US 2003/0020598 A1   Jan. 30, 2003

Related U.S. Application Data

(63) Continuation of application No. PCT/EP00/11744, filed on Nov. 24, 2000.

(30) Foreign Application Priority Data
Dec. 9, 1999  (DE) .......................... 299 21 462 U
Dec. 9, 1999  (EP) .............................. 99124537

(51) Int. Cl.
*H04B 7/00*   (2006.01)
*H04B 17/00*  (2006.01)
*H04Q 7/20*   (2006.01)
*H04Q 5/22*   (2006.01)

(52) U.S. Cl. ............... 455/41.2; 455/456.1; 455/456.6; 455/67.11; 340/10.51

(58) Field of Classification Search ............... 455/41.1, 455/41.2, 41.3, 42, 410–411, 418–421, 500, 455/507, 60, 456.1–456.6, 404.2, 422.1, 455/423–425, 43, 514, 67.11, 67.16, 85–86, 455/550.1, 70, 95, 115.1, 126; 342/118, 342/127; 340/10.1, 10.2, 10.3, 10.4, 505, 340/527, 539.1, 539.11, 539.15, 539.32, 568.5, 340/572.1, 10.41, 10.42, 10.51, 10.52
See application file for complete search history.

(56) References Cited

U.S. PATENT DOCUMENTS

| | | | | |
|---|---|---|---|---|
| 4,114,155 A | * | 9/1978 | Raab | 342/394 |
| 4,360,810 A | * | 11/1982 | Landt | 342/44 |
| 4,691,202 A | * | 9/1987 | Denne et al. | 340/825.54 |
| 4,833,480 A | * | 5/1989 | Palmer et al. | 342/125 |

(Continued)

FOREIGN PATENT DOCUMENTS

EP   0 638 871 A2   2/1995

(Continued)

*Primary Examiner*—William Trost
*Assistant Examiner*—Meless Zewdu
(74) *Attorney, Agent, or Firm*—Sughrue Mion, PLLC

(57) ABSTRACT

A method and system for transferring data between at least one read/write device (RWD) and at least one mobile data memory (MDM). The mobile data memory (MDM) is preferably attached to an object for recording object-related status and/or process data, e.g. in a dispatch, transport and/or manufacturing system for the individual objects. According to the method, a difference in transfer time between the received data signals of a mobile data memory (MDM) and transmitted data signals of the read/write device (RWD) is determined in the read/write device (RWD) and the received data signals of the mobile data memory (MDM) are processed further in said read/write device (RWD) only if the difference in transfer time which has been determined lies within a predefined transfer time limit.

19 Claims, 2 Drawing Sheets

U.S. PATENT DOCUMENTS

| | | | |
|---|---|---|---|
| 5,488,631 A * | 1/1996 | Gold et al. | 375/145 |
| 5,898,931 A * | 4/1999 | I'Anson et al. | 455/560 |
| 5,933,079 A * | 8/1999 | Frink | 340/572.4 |
| 6,084,512 A * | 7/2000 | Elberty et al. | 340/572.1 |
| 6,353,406 B1 * | 3/2002 | Lanzl et al. | 342/118 |
| 6,407,695 B1 * | 6/2002 | Stierlin et al. | 342/42 |
| 6,538,564 B1 * | 3/2003 | Cole | 340/10.4 |
| 6,600,428 B1 * | 7/2003 | O'Toole et al. | 340/825.36 |

FOREIGN PATENT DOCUMENTS

| | | |
|---|---|---|
| WO | WO 98/16849 A1 | 4/1998 |

* cited by examiner

METHOD AND SYSTEM FOR DATA COMMUNICATION BETWEEN A READ/WRITE DEVICE AND A MOBILE MEMORY DEVICE BASED ON TRANSFER-TIME MEASUREMENT

This is a Continuation of International Application PCT/EP00/11744, with an international filing date of Nov. 24, 2000, which was published under PCT Article 21(2) in German, and the disclosure of which is incorporated into this application by reference.

FIELD OF AND BACKGROUND OF THE INVENTION

The invention relates to a method and a system for transferring data between at least one read/write device and at least one mobile data memory in an identification system with at least one mobile data memory attached to at least one object, for detecting object-related data of the at least one object.

Identification systems known from the prior art include at least one stationary read/write device for contactless data exchange with mobile data carriers, typically by means of a radio-based data transfer link. Such systems are used in technical installations where a plurality of objects or goods must be moved, and possibly otherwise processed, as quickly and freely as possible. The objects can range through the widest variety of types, e.g. packages in a dispatch system, assembly components in a manufacturing system, luggage in a transport system, moving vehicles, etc. As a rule it is necessary, at defined locations within the system, e.g. a manufacturing plant, to determine quickly and freely, for instance, the type, condition, and/or status of the objects actually found in spatial proximity to these locations. For this purpose, the objects on the one hand are provided with mobile data memories, which contain, for instance, data that identifies the type, condition, and/or current status of the objects. On the other hand, read/write devices are placed at the defined locations within the system and are frequently connected to central data processing equipment.

If such objects, e.g. in the course of manufacture, are transported into spatial proximity of a selected location, the stationary read/write device that is arranged there can contactlessly detect and, if necessary, change the data in the mobile data memories of the objects that are currently within its detection range. The data can then be evaluated for various purposes by means of higher-level central data processing equipment, e.g. to track the path of the objects that are provided with the mobile data memories and, as a function thereof, to control operational equipment of the corresponding technical system.

In technical installations, the objects or goods provided with mobile data memories are usually moved along predefined paths with the aid of technical transport means, e.g. conveyor belts. The paths of these transport means can ran closely spaced together or be superimposed or run in parallel. To detect the flow of the objects along the respective paths, read/write devices may be assigned to the paths. Mostly to monitor and control the flow of the objects, these read/write devices have the function to exchange data with the mobile data memories attached to those objects that are being transported along the corresponding path or by the corresponding transport means.

In such situations, the problem may arise that a read/write device inadvertently exchanges data with a mobile data memory attached to an object that is being moved along a non-corresponding but spatially adjacent path. There may be a wide variety of causes for this, e.g. poor mechanical configurations, overreach, reflection effects, and fluctuations in the position of the individual objects on the respective transport path. Thus, in many cases where mobile data memories are used, for instance, to control and track goods, it is necessary to limit the location of corresponding mobile data memories in order to prevent miscommunications.

To avoid such miscommunications, various methods are known and used in the art.

In a first method, the detection area or communication range of the read/write devices is limited. This prevents any unwanted communication with mobile data memories that are located, for instance, in an adjacent assembly line. In practice, wren however, limiting the detection range also strongly limits the possible applications of such an identification system. Nor is it always possible in practice to distinguish mobile data memories in this manner with sufficient reliability. The reason for this, on the one hand, is the width of e.g. the assembly lines. They require a sufficiently large communication range of the read/write devices to permit reliable identification of objects and their data memories that are traveling in rapid succession and/or are poorly positioned on the conveyor belt. On the other hand, conveyor belts in manufacturing plants are often spaced so tightly together that it is difficult to avoid crosstalk of the communication range of read/write devices on one conveyor belt to an adjacent conveyor belt.

In a second method, the communication range of the read/write devices is not limited, but additional status information is kept available in the individual mobile data memories. This makes it possible to ensure that communication between a read/write device and mobile data memories can take place only in a fixed sequence. These types of data memories, however, cannot be used universally. Furthermore, additional physical measures to protect against overreach are nevertheless required, particularly at the beginning of a data exchange.

In yet another method, the communication range of the read/write devices is also not limited. By measuring the signal level of the data streams sent by the mobile data memories, their distance from the corresponding read/write device is estimated. This makes it possible to decide whether a data stream comes from a corresponding or from a foreign mobile data memory. This method has the particular drawback, however, that it cannot be used in closed spaces, such as factory bays, i.e. in indoor applications. The reason for this is that, due to multiple reflections in buildings, there can be strong fluctuations in the received field strength. As a result, a determination of the range by evaluating signal levels is subject to too much error.

OBJECTS OF THE INVENTION

An object of the present invention is to define a method for transferring data between at least one read/write device and at least one mobile data memory, which improves over the aforementioned drawbacks.

SUMMARY OF THE INVENTION

This and other objects are attained by, according to one formulation, a method that includes: sending a data signal from a read/write device to the at least one mobile data memory; returning a modulated data signal from the at least one mobile data memory to the read/write device; determining a difference in transfer time between a received modulated data signal of a mobile data memory and the data signal of the read/write device; and processing the modulated data signal of the mobile data memory if the determined difference in transfer time is below a predefined transfer time limit. According to a further formulation, the invention provides an identification system that includes: a read write device; a plurality of objects in motion; and a plurality of mobile data memories correlated with said objects; wherein the read write device is configured with at least one of hardware or software to transmit a plurality of data signals, wherein the data memories are each configured with at least one of hardware or software to return at least one of the data signals as a modulated data signal, and wherein the read write device is further configured with at least one of hardware or software to receive the modulated data signal, to determine a difference in transfer time between the at least one data signal and the modulated data signal, and to compare the determined difference with a limit value.

The inventive method for transferring data is based on a transfer time measurement of the data signals sent in the form of e.g. radio signals by the mobile data memories of an identification system. Herein, the read/write device initially sends a data signal to at least one mobile data memory.

In a second step, the read/write device receives modulated data signals returned by the at least one mobile data memory, and the difference in the transfer time between the respectively received modulated data signal of the mobile data memory and the transmitted data signal of the read/write device is determined.

The modulated data signal of the mobile data memory received in the read/write device is processed if the difference in the transfer time determined in the read/write device is below a predetermined transfer time limit. In a variant of this method, the modulated data signal of the mobile data memory is processed only if the determined difference in transfer time is above a predefined transfer time threshold.

The difference in the transfer time is used as the decision criterion to evaluate the respective distance between the read/write device and the respective mobile data memory.

In a variant of this method, the read/write device sends unmodulated data signals with continuously changed transmission frequency to at least one mobile data memory. The phase shift between a received modulated data signal of a mobile data memory and the transmitted unmodulated data signal of the read/write device is then determined in the read/write device.

According to an alternative variant of this method, the read/write device sends a modulated data signal to at least one mobile data memory, and autocorrelation functions of the transmitted data signals of the read/write device and the received data signals of the mobile data memory are generated in the read/write device.

BRIEF DESCRIPTION OF THE DRAWINGS

Further details of the invention, including the various adaptations thereof, will now be described by means of exemplary embodiments with reference to the drawing figures, in which.

DETAILED DESCRIPTION OF THE PREFERRED EMBODIMENTS

Figure 1:
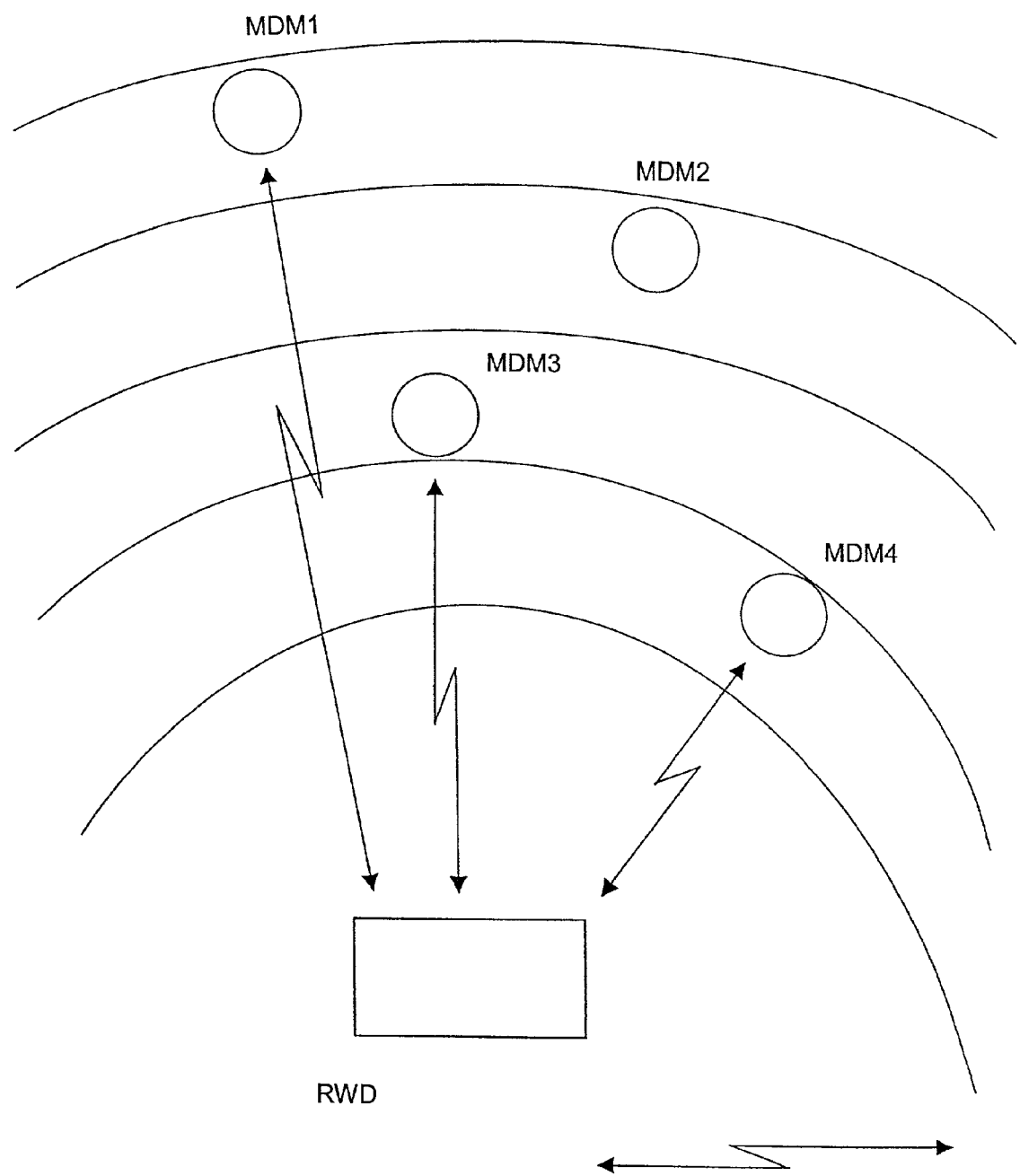
FIG. 1 is a schematic representation of a read/write device with mobile data memories located at different distances from the read/write device.

FIG. 1 shows mobile data memories (MDM 1–4) that are arranged at different distances from the read/write device (RWD) and communicate with the read/write device (RWD) via radio signals for data transfer.

According to the inventive method, the read/write device (RWD) receives and further processes returned data signals of the mobile data memories (MDM) only if the corresponding mobile data memories (MDM) are located within a predefined maximum distance from the read/write device (RWD) or within a predefined distance range relative to the read/write device (RWD). In one exemplary variant of the invention, the modulated data signal of the mobile data memory received in the read/write device is processed if the difference in the transfer time determined in the read/write device is below a predetermined transfer time limit. Alternatively, the modulated data signal of the mobile data memory may be processed only if the determined difference in transfer time is above a predefined transfer time threshold.

According to a first variant of the inventive method, the read write/drive (RWD) sends modulated data signals to the mobile data memories (MDM) located in its vicinity. The mobile data memories (MDM) receive these modulated data signals of the read/write device (RWD) and process them within processing time $t_0$ (cf. FIG. 2). The respective mobile data memory (MDM) then returns a modulated data signal to the read/write device (RWD).

The read/write device (RWD) also receives data signals that are transmitted by foreign mobile data memories (MDM) or mobile data memories that are too remote. These data signals should be excluded from further signal processing in the read/write device (RWD).

For this purpose, autocorrelation functions of the transmitted data signals of the read/write device (RWD) and the received data signals of the respective mobile data memories (MDM) are advantageously generated. If the respective autocorrelation functions show a minimum, the read/write device (RWD) determines this as an indication of a phase shift between the transmitted data signals of the read/write device (RWD) and the received data signal of the respective mobile data memories (MDM), and the respective received data signal of the mobile data memory (MDM) is not taken into account in further signal processing.

Advantageously, spread spectrum data signals are transferred and exchanged between the read/write device (RWD) and the mobile data memories (MDM).

According to a simple variant of the method, it is determined whether a phase synchronization exists between the data signals of the read/write device (RWD) and the received data signals of the mobile data memory (MDM). Phase synchronization is present if the sum of the transfer times of the data signal of the read/write device (RWD) to a proximate mobile data memory (MDM) plus a processing time $t_0$ for the mobile data memory (MDM) to generate the data signal that is to be returned plus the transfer time of the data signal returned by the mobile data memory (MDM) to the read/write device (RWD) is shorter than the length of a signal chip, i.e. a time slot in the time-slot patterned data stream of consecutive data signals of the read/write device (RWD).

If a data signal returned by the mobile data memory (MDM) is received again in the read/write device (RWD) within the sum of processing time $t_0$ and capture range time $t_C$ (i.e. the maximum transfer time from the read/write device (RWD) to the mobile data memory (MDM) and back again), the returned data signal of the mobile data memory (MDM) falls within the predetermined range.

Figure 2:
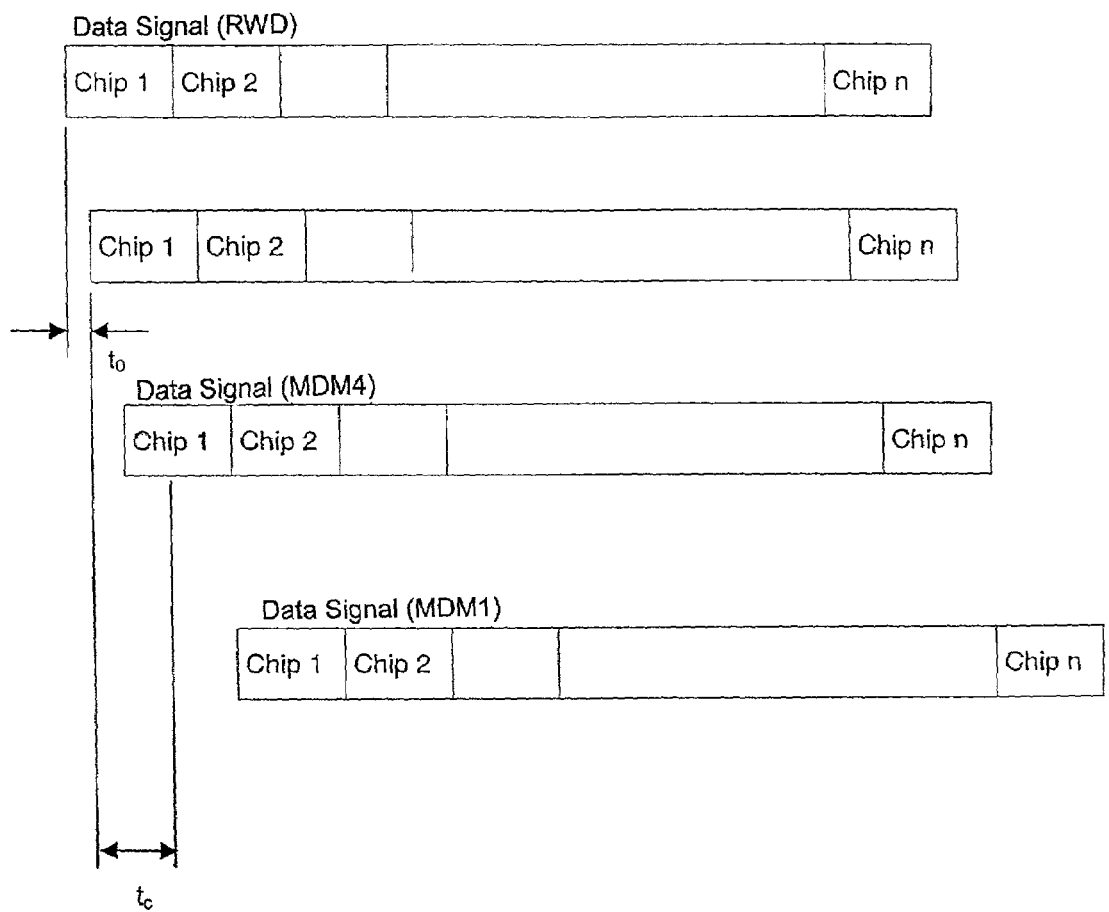
FIG. 2 is a schematic representation of detected and non-detected data signals of mobile data memories.

In the schematic representation according to FIG. 2, the returned data signal of the mobile data memory (MDM 4) is within the time window formed by the sum of $t_0$ and $t_C$, while the data signal (MDM 1) lies outside the predetermined range and will not be further processed in the read/write device (RWD), due to lack of phase synchronization.

Neglecting the processing time to, the maximum chip time length of the time slot in the patterned data signal of the read/write device (RWD) is obtained from the range of the read/write device (RWD) to the mobile data memory (MDM) and back, divided by the propagation rate of the electromagnetic waves, i.e. the speed of light.

According to a further variant of the inventive method, the read/write device (RWD) sends unmodulated data signals with a continuously changing transmission frequency (e.g. according to a saw-tooth function) to adjacent mobile data memories (MDM). These signals of the read/write device (SGL) received by mobile data memories (MDM) are returned to the read write device (RWD) by passive backscatter modulation without any further processing time within the mobile data memory (MDM).

In the read/write device (RWD), the phase of the returned data signal modulated by a sub-carrier in the mobile data memory (MDM) is detected at the beginning and at the end of a time slot of the patterned data stream of the read/write device (RWD). A detected phase difference relative to the transmitted data signal of the read/write device (RWD) is proportional to the distance between the read/write device (RWD) and the mobile data memory (MDM), whose returned data signal was received. These phase differences are determined repeatedly and then averaged.

With a maximum phase difference that is predefined as a limit value in the read/write device (RWD), returned data signals of mobile data memories (MDM) that exceed this phase limit can be excluded from further signal processing in the read/write device (RWD).

The above description of the preferred embodiments has been given by way of example. From the disclosure given, those skilled in the art will not only understand the present invention and its attendant advantages, but will also find apparent various changes and modifications to the methods and structures disclosed. It is sought, therefore, to cover all such changes and modifications as fall within the spirit and scope of the invention, as defined by the appended claims, and equivalents thereof.

What is claimed is:

1. Method for transferring data between at least one read/write device and at least one mobile data memory in an identification system with at least one mobile data memory attached to at least one object, for detecting object-related data of the at least one object, comprising:
sending a data signal from the read/write device to the at least one mobile data memory;
returning a modulated data signal from the at least one mobile data memory to the read/write device;
determining a difference in transfer time between a received modulated data signal of a mobile data memory and the data signal of the read/write device; and
processing the modulated data signal of the mobile data memory if the determined difference in transfer time is below a predefined transfer time limit.

2. Method as claimed in claim 1, wherein the object-related data comprises at least one of status data and process data.

3. Method as claimed in claim 1, wherein the difference in transfer time is determined in the read/write device and the modulated data signal is processed in the read/write device.

4. Method as claimed in claim 1, wherein the read/write device sends a plurality of unmodulated data signals with a continuously changing transmission frequency to the at least one mobile data memory.

5. Method as claimed in either claim 1, wherein a phase shift between the received modulated data signal of the mobile data memory and the transmitted data signal of the read/write device is determined in the read/write device.

6. Method as claimed in claim 5, wherein the data signal is an unmodulated data signal.

7. Method as claimed in claim 1, wherein data transfer between the read/write device and the mobile data memory is divided into time slots.

8. Method as claimed in claim 7, wherein the data signal from the read/write device is sent to the at least one mobile data memory in a predetermined one of the time slots.

9. Method as claimed in claim 1, wherein the modulated data signal of the at least one mobile data memory is returned to the read/write device by passive backscatter modulation of the data signal of the read/write device.

10. Method as claimed in claim 9, wherein the data signal is an unmodulated data signal.

11. Method as claimed in claim 1, wherein the read/write device sends a modulated data signal to the at least one mobile data memory.

12. Method as claimed in claim 11, wherein the read/write device sends a spread spectrum data signal to the at least one mobile data memory.

13. Method as claimed in claim 12, wherein the spread spectrum data signal is received by the at least one mobile data memory and returned to the read/write device.

14. Method as claimed in claim 11, wherein the read/write device generates autocorrelation functions of data signals transmitted from the read/write device and data signals received from the mobile data memory.

15. Method as claimed in claim 1, wherein the modulated data signal of the mobile data memory is processed only if the determined difference in transfer time is also above a predefined transfer time threshold.

16. Identification system comprising:
a read write device;
a plurality of objects in motion; and
a plurality of mobile data memories correlated with said objects;
wherein said read write device is configured with at least one of hardware or software to transmit a plurality of data signals, wherein said data memories are each configured with at least one of hardware or software to return at least one of the data signals as a modulated data signal, and wherein said read write device is further configured with at least one of hardware or software to receive the modulated data signal, to determine a difference in transfer time between the at least one data signal and the modulated data signal, and to compare the determined difference with a limit value.

17. System as claimed in claim 16, wherein said read write device is further configured with at least one of hardware or software to process the modulated data signal only if the determined difference is below the limit value.

18. System as claimed in claim 16, wherein said read write device is further configured with at least one of hardware or software to process the modulated data signal only if the determined difference is within a value window.

19. System as claimed in claim 16, wherein the identification system is a component of at least one of a dispatch, transport or manufacturing system.

* * * * *